(12) United States Patent
Kondo et al.

(10) Patent No.: US 7,243,974 B2
(45) Date of Patent: Jul. 17, 2007

(54) LOCKING DEVICES FOR VEHICLE SEATS

(75) Inventors: Tokuji Kondo, Toyota (JP); Taiyo Ootuka, Toyota (JP); Yoshinori Kobayashi, Toyota (JP); Makoto Asano, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 155 days.

(21) Appl. No.: 10/945,844

(22) Filed: Sep. 21, 2004

(65) Prior Publication Data

US 2005/0104384 A1 May 19, 2005

(30) Foreign Application Priority Data

| Sep. 22, 2003 | (JP) | ............................. 2003-330292 |
| Feb. 27, 2004 | (JP) | ............................. 2004-053938 |
| Aug. 26, 2004 | (JP) | ............................. 2004-246634 |

(51) Int. Cl.
*B60N 2/00* (2006.01)

(52) U.S. Cl. .................................... 296/65.03; 292/216

(58) Field of Classification Search ................. 296/63, 296/65.03, 65.01, 65.05, 65.08, 65.09; 297/336, 297/331; 292/216, 240, DIG. 43
See application file for complete search history.

(56) References Cited

U.S. PATENT DOCUMENTS 4,765,682 A  8/1988  Satoh
6,123,379 A * 9/2000 Yamada et al. .......... 296/65.03
6,412,849 B1  7/2002  Fast
6,715,841 B2  4/2004  Christoffel et al.

FOREIGN PATENT DOCUMENTS

| DE | 102 02 344 A1 | 4/2003 |
| DE | 203 02 007 U1 | 5/2003 |
| EP | 0 709 249 A2 | 5/1996 |
| JP | 11-208333 | 8/1999 |

* cited by examiner

*Primary Examiner*—Lori L. Lyjak
(74) *Attorney, Agent, or Firm*—Patterson, Thuente, Skaar & Christensen, P.A.

(57) ABSTRACT

A locking devices may include a striker and a locking mechanism. The locking mechanism may include a base plate having a slot that can receive the striker, a latch rotatably attached to the base plate, a pawl rotatably attached to the base plate, and a cam member rotatably attached to the base plate. The locking mechanism includes a force transmitting path for transmitting a force that urges the locking mechanism in a locking condition to be disengaged from the striker. The force transmitting path passes through the cam member and includes a force interrupting portion positioned therein. The force interrupting portion is arranged and constructed to interrupt the force transmitting path when the force exceeds a predetermined value.

21 Claims, 12 Drawing Sheets

LOCKING DEVICES FOR VEHICLE SEATS

BACKGROUND OF THE INVENTION

1. Field of the Invention

The present invention relates to locking devices used in a seat mounting device of a vehicle seat. More particularly, the present invention relates to locking devices used in a seat mounting device for removably mounting a vehicle seat on a vehicle body.

2. Description of the Related Art

A locking device used in a seat mounting device for removably mounting a vehicle seat on a vehicle body is taught, for example, by Japanese Laid-Open Patent Publication Number 2003-518465.

In the known art described in Japanese Laid-Open Patent Publication Number 2003-518465, a striker is attached to a vehicle floor and a locking mechanism is attached to a vehicle seat. The locking mechanism includes a base plate having a slot that can receive the striker, a latch that is rotatably attached to the base plate via a pivot pin, a pawl and a cam member. The latch can be retained in a locking position or an unlocking position by means of the pawl. The cam member forces the pawl in a predetermined rotational direction when the locking mechanism is in a locking condition. As a result, the latch can be urged to the locking position. Thus, the latch can closely clamp the striker within the slot of the base plate.

However, when the locking mechanism is subjected to a large force, the locking mechanism is upwardly pulled so that the latch is applied with a large rotational force. As a result, the pawl is also applied with a large corresponding force so as to be deformed. Thus, if such a large force is applied to the locking mechanism, the locking mechanism cannot be retained in a locking condition.

SUMMARY OF THE INVENTION

It is, accordingly, one object of the present teachings to provide improved locking devices used in a mounting device for removably mounting a vehicle seat on a vehicle body.

For example, in one aspect of the present teachings, a locking devices may include a striker attached to one of two members to be interconnected and a locking mechanism attached to the other of the two members. The locking mechanism may include a base plate having a slot that can receive the striker, a latch rotatably attached to the base plate, a pawl rotatably attached to the base plate, and a cam member rotatably attached to the base plate. The latch is arranged and constructed to clamp the striker within the base plate slot so that the locking mechanism is in a locking condition. The pawl is arranged and constructed to engage the latch so that the locking mechanism is retained in a locking condition. The cam member is arranged and constructed to contact the latch when the locking mechanism is in a locking condition. The locking mechanism includes a force transmitting path for transmitting a force that urges the locking mechanism in the locking condition to be disengaged from the striker. The force transmitting path passes through the cam member and includes a force interrupting portion positioned therein. The force interrupting portion is arranged and constructed to interrupt the force transmitting path when the force exceeds a predetermined value.

According to the present teachings, when the locking mechanism is in a locking condition, even if a large force is applied to the locking mechanism in a direction such that the locking mechanism is disengaged from the striker, the latch is effectively prevented from rotating because the cam member contacts the latch. Therefore, the locking mechanism can be reliably retained in the locking condition.

Further, when the locking mechanism is in the locking condition, if an excessively large force is applied to the locking mechanism in a direction such that the locking mechanism is disengaged from the striker, the force interrupting portion interrupts the force transmitting path so that the latch can contact the pawl. Thus, the locking mechanism is successively retained in the locking condition.

Other objects, features and advantage of the present invention will be readily understood after reading the following detailed description together with the accompanying drawings and the claims.

DETAILED DESCRIPTION OF THE INVENTION

Four detailed representative embodiments of the present teachings will now be described in further detail with reference to FIGS. 1 to 16.

First Detailed Representative Embodiment

The first detailed representative embodiment will now be described with reference to FIGS. 1 to 6.

Figure 1:
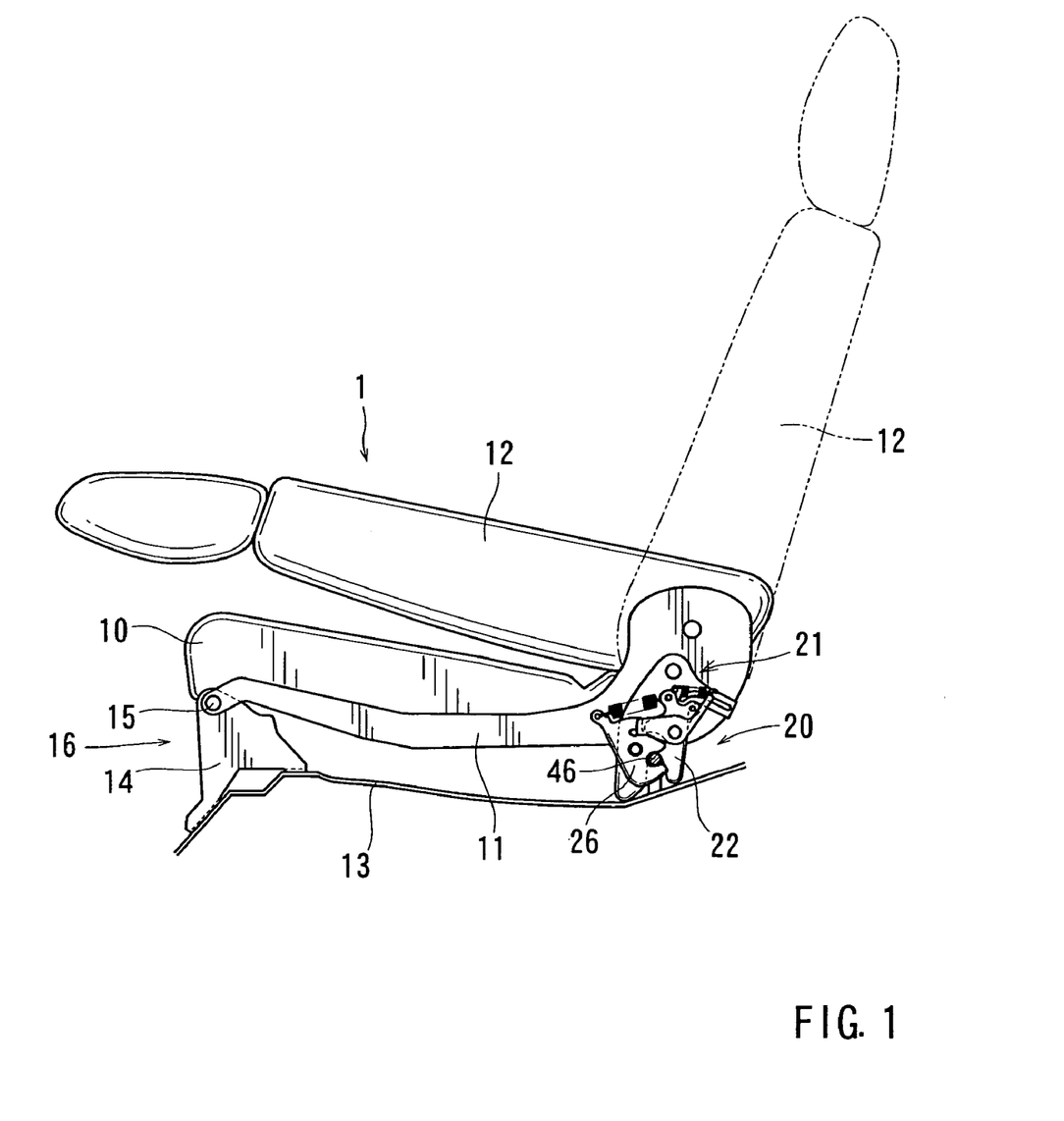
FIG. 1 is a perspective view of a vehicle seat mounted on a floor by means of a seat mounting device that includes a locking device according to a first embodiment of the present teachings.

As shown in FIG. 1, a vehicle seat 1 exemplified in this embodiment is a retractable rear seat. That is, the vehicle seat 1 is a common type of seat that can be folded and put against a front seat (not shown). Typically, the seat 1 comprises a seat cushion 10 and a seat back 12. The seat cushion 10 and the seat back 12 are rotatably or pivotally connected via a reclining mechanism (not shown). As a result, the seat back 12 can be rotated from a raised or vertical position shown by a broken line in FIG. 1 to a folded or horizontal position shown by a solid line in FIG. 1. Further, a tilt angle of the seat back 12 in the vertical position can be adjusted over a predetermined range by means of the reclining mechanism.

As shown in FIG. 1, the seat cushion 10 is mounted on a vehicle floor (i.e., a first member) 13 via a pair of seat mounting devices (one of which is shown in FIG. 1) that are positioned on both sides of the seat cushion 10. Each of the seat mounting devices includes a front or first mounting unit 16 and a rear or second mounting unit (i.e., a locking device) 20.

The front mounting unit 16 includes a bracket 14 attached to the vehicle floor 13. The bracket 14 is rotatably connected to the front end of a cushion frame (i.e., a second member) 11 of the seat cushion 10 via a pivot pin 15. As a result, the seat cushion 10 may preferably be rotatably supported on the vehicle floor 13 at a front end thereof via the front mounting unit 16.

The rear mounting unit 20 releasably connects the rear end of the cushion frame 11 to the vehicle floor 13. Therefore, the seat cushion 10 may preferably be releasably supported on the vehicle floor 13 at a rear end thereof via the rear mounting unit 20. Typically, the rear mounting unit 20 may include a striker or longitudinal bar 46 that is attached to the vehicle floor 13 and a locking mechanism 21 that is attached to the rear end of the cushion frame 11.

As will be appreciated, the bar 46 may act as an engagement member that can cooperate with the locking mechanism 21. The bar 46 is positioned so as to transversely extend across the vehicle floor 13.

Figure 2:
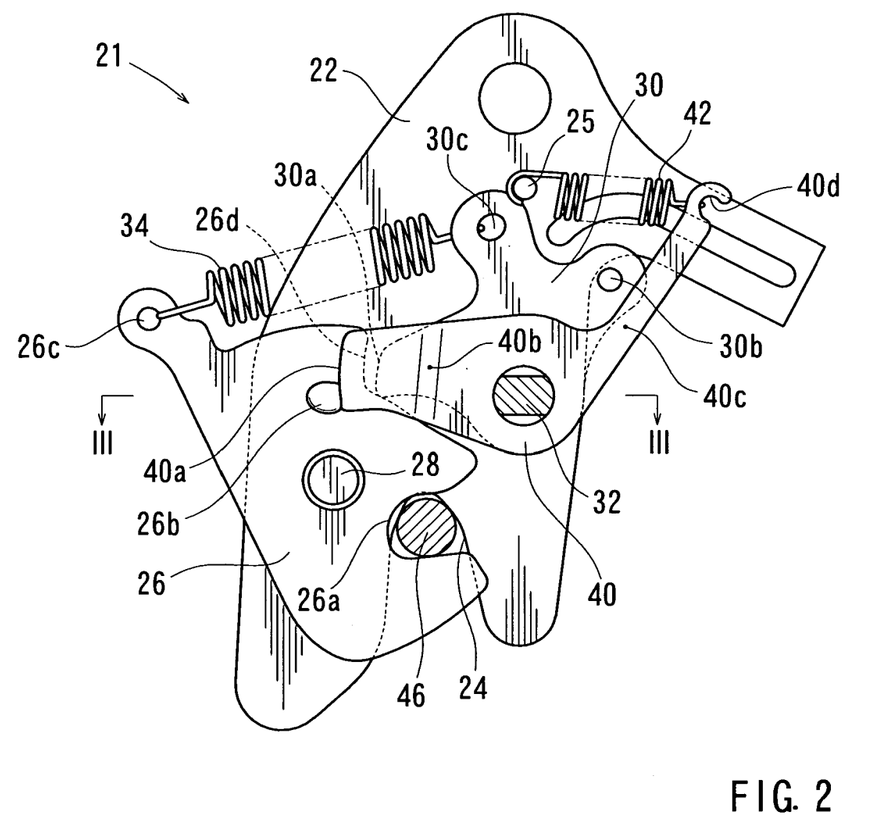
FIG. 2 is a side view of the locking device, which view illustrates a locking condition thereof.
Figure 3:
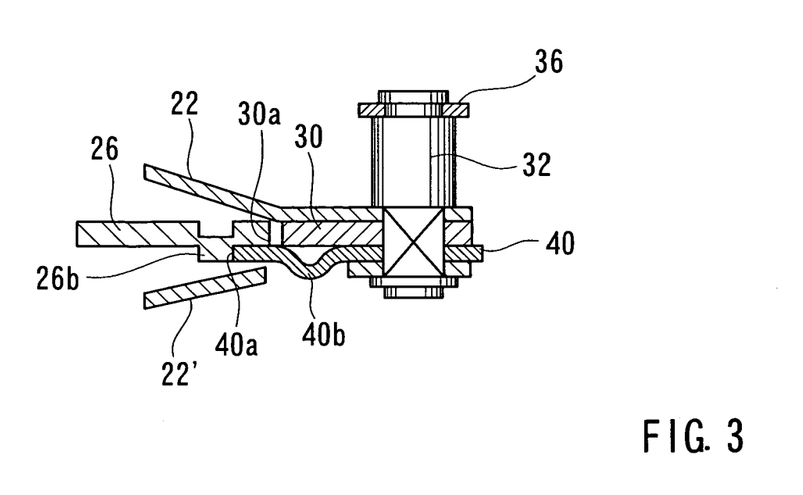
FIG. 3 is a cross-sectional view taken along line III—III in FIG. 2.
Figure 4:
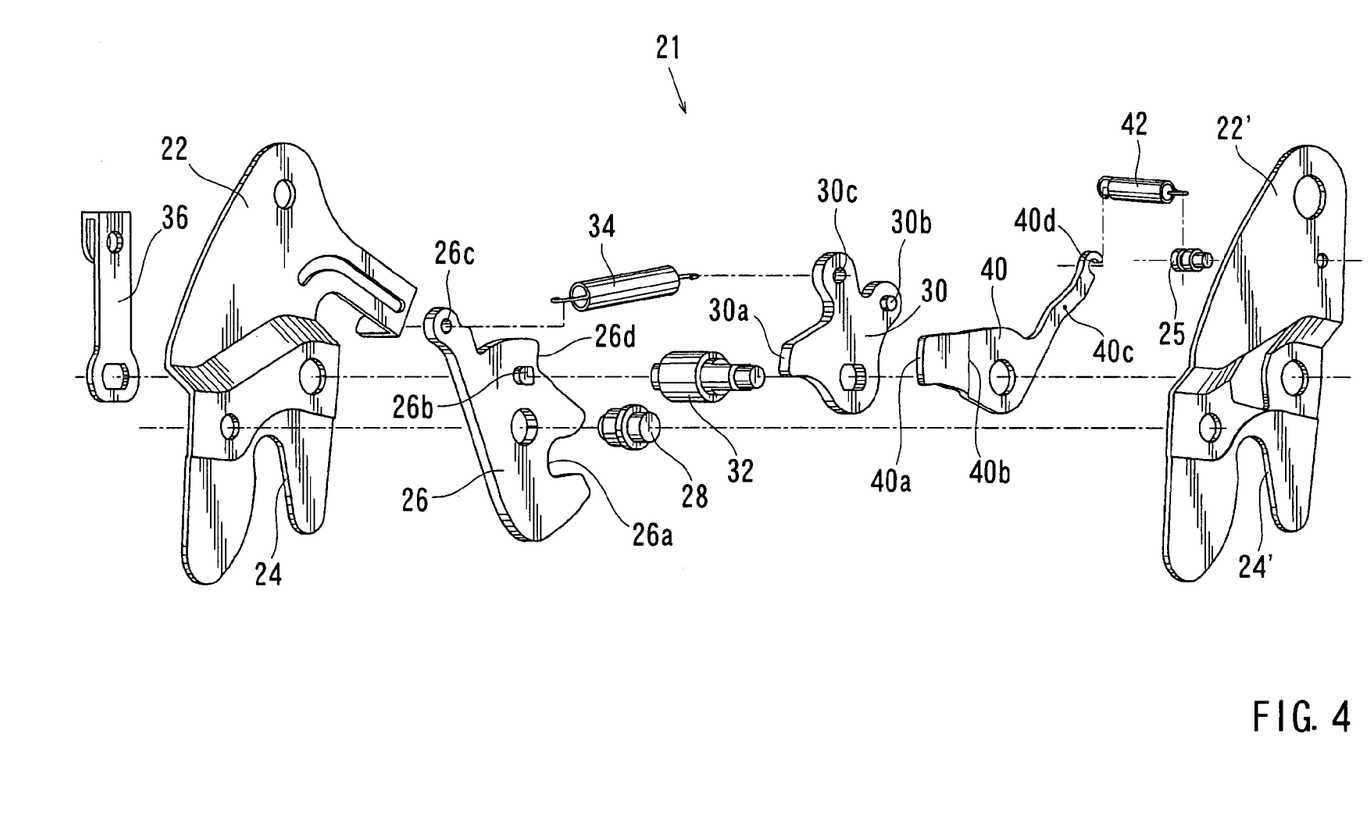
FIG. 4 is an exploded perspective view of a locking mechanism of the locking device.

As shown in FIGS. 2 to 4, the locking mechanism 21 may include a first base plate 22, a latch 26, a pawl 30, a cam member 40 and a second base plate 22'. As will be apparent from FIG. 3, the latch 26, the pawl 30 and the cam member 40 may preferably be positioned between the both base plates 22 and 22'. Further, the latch 26 and the pawl 30 are disposed in substantially the same plane. Also, the cam member 40 is superimposed over the pawl 30. As will be appreciated, in FIG. 2, the base plate 22' is omitted for clarification.

The base plate 22 is fixtedly connected to the rear end of the cushion frame 11 (FIG. 1). As best shown in FIG. 4, the base plate 22 may preferably have a U-shaped slot 24 that is formed in a lower end thereof and downwardly opens. The slot 24 is arranged and constructed to engage the bar 46 therein. Further, the slot 24 is downwardly widened for easy engagement of the bar 46.

As shown in FIG. 2, the latch 26 is rotatably connected to the base plate 22 via a rotational shaft or pivot pin 28. As best shown in FIG. 4, the latch 26 may preferably have a U-shaped hook slot 26a that laterally opens. The hook slot 26a can engage and disengage the bar 46 that is received in the slot 24 when the latch 26 is rotated. As will be appreciated, when the hook slot 26a engages the bar 46 that is received in the slot 24 (FIG. 2), the bar 46 can be securely clamped within the slot 24 by the latch 26 so that the locking mechanism 21 is locked (which will be hereinafter described). Further, the latch 26 may preferably be formed with a laterally facing contact surface 26d that is positioned above the hook slot 26a. Also, the latch 26 may preferably be formed with a projection 26b that projects downward (as seen in FIG. 3) parallel to the longitudinal axis of the pivot pin 28. The projection 26b may preferably be positioned adjacent to the contact surface 26d. In addition, the latch 26 may have an upper extension having a spring engagement aperture 26c.

As shown in FIG. 3, the pawl 30 may preferably have the same thickness as the latch 26. Also, the pawl 30 may preferably be positioned laterally adjacent to the latch 26 so that the pawl 30 and the latch 26 are positioned in substantially the same plane. In other words, the pawl 30 may preferably be positioned so as to be laterally aligned with the latch 26. The pawl 30 thus positioned is connected to the base plate 22 via a rotational shaft or pivot pin 32 that is rotatably attached to the base plate 22. The pawl 30 may preferably be connected to the pivot pin 32 so as to rotate integrally with the pivot pin 32. The pawl 30 may preferably be formed with a laterally extending pawl extension having an engagement surface 30a. The engagement surface 30a can engage or contact the contact surface 26d of the latch 26 when the latch 26 is rotated clockwise. As will be apparent from FIG. 2, the engagement surface 30a does not contact the contact surface 26d of the latch 26 when the hook slot 26a of the latch 26 completely engages the bar 46 (i.e., when the locking mechanism 21 is in a locking condition). Further, the pawl 30 may preferably have a lateral extension that extends in a direction opposite to the pawl extension. The lateral extension may preferably be formed with a projection 30b that projects parallel to the longitudinal axis of the pivot pin 32. Also, the pawl 30 may preferably have a vertical extension having a spring engagement aperture 30c.

As shown in FIG. 2, an extension spring 34 is disposed between the latch 26 and the pawl 30. The extension spring 34 respectively engages the spring engagement aperture 26c of the latch 26 and the spring engagement aperture 30c of the pawl 30. Thus, the latch 26 may preferably be biased clockwise around the pivot pin 28 by means of the spring 34. Also, the pawl 30 may preferably be biased counterclockwise around the pivot pin 32 by means of the spring 34.

As shown in FIGS. 2 and 3, the cam member 40 may preferably be positioned between the pawl 30 and the base plate 22'. The cam member 40 thus positioned is rotatably supported by the pivot pin 32. The cam member 40 may preferably have a cam extension that extends in the same direction as the pawl extension of the pawl 30. The cam extension may preferably be formed with a cam surface 40a. Further, as best shown in FIG. 2, the distance between the cam surface 40a and the pivot pin 32 is greater than the distance between the engagement surface 30a of the pawl 30 and the pivot pin 32 so that the cam surface 40a can engage or contact the projection 26b of the latch 26 when the hook slot 26a of the latch 26 completely engages the bar 46 (i.e., when the locking mechanism 21 is in the locking condition).

The cam surface 40a may preferably be designed so as to provide an appropriate angle of pressure at a contact point between the cam surface 40a and the projection 26b of the latch 26. That is, the cam surface 40a may preferably be shaped such that the cam member 40 can be prevented from rotating (clockwise or counterclockwise) when the cam surface 40a is applied with a force via the projection 26b of the latch 26 (i.e., when the locking mechanism 21 is applied with an unexpected force that urges the locking mechanism 21 to be disengaged from the bar 46 so that the latch 26 is applied with a clockwise rotational force). Therefore, even if the locking mechanism 21 is subjected to a relatively large force so as to be upwardly pulled and consequently the latch 26 is urged to be rotated clockwise, the cam member 40 cannot be rotated by means of the rotational force of the latch 26.

Also, as shown in FIGS. 2 and 3, the cam extension of the cam member 40 may preferably be formed with a transversal bent or shouldered portion 40b (i.e., a weakened or deformable portion) between the cam surface 40a and the pivot pin 32. Thus, the cam member 40 can be easily deformed at the bent portion 40b when a relatively small force (i.e., a force of approximately 500–600 kgf) is applied thereto via the latch 26.

The cam member 40 may preferably have an upper elongated portion 40c that upwardly obliquely extends in a direction opposite to the cam extension. The elongated portion 40c may preferably be formed with a hook 40d. As best shown in FIG. 2, the hook 40d is provided with a tension spring 42, which engages an engagement pin 25 attached to the base plate 22. Thus, the cam member 40 may preferably be biased counterclockwise around the pivot pin 32 by means of the spring 42.

As shown in FIG. 4, a release lever 36 may preferably be disposed in the outside of the base plate 22. The release lever 36 is connected to the pivot pin 32 at one end. Also, the release lever 36 is connected to an actuator cable (not shown) at the other end so as to be actuated when the cable is pulled (i.e., when a lock releasing operation is carried out). As will be appreciated, the lever 36 and the cable are arranged and constructed such that the lever 36 and the pivot pin 32 can be rotated clockwise (i.e., in an unlocking direction) when the actuator cable is pulled, thereby rotating the pawl 30 clockwise.

When the seat cushion 10 is mounted on a vehicle floor 13 (FIG. 1), the locking mechanism 21 is in the locking condition. In this condition, as previously described, the hook slot 26a of the latch 26 engages the bar 46 that is received in the slot 24 of the base plate 22 (FIG. 2) so as to clamp the bar 46 within the slot 24. In this locking condition of the locking mechanism 21, the projection 26b of the latch 26 engages or contacts the cam surface 40a of the cam member 40 by means of the spring force of the extension spring 34. Thus, the latch 26 may preferably be prevented from rotating clockwise so as to be retained in a locking position (FIG. 2). As a result, the latch 26 can hold or clamp the bar 46 within the slot 24 of the base plate 22.

As shown in FIG. 2, when the locking mechanism 21 is in the locking condition, the engagement surface 30a of the pawl 30 is spaced apart from the contact surface 26d of the latch 26. However, the projection 26b of the latch 26 engages or contacts the cam surface 40a of the cam member 40 by means of the spring force of the extension spring 34. Thus, the latch 26 is reliably retained in the locking position substantially by means of the cam member 40.

As will be recognized, when the locking mechanism 21 is in the locking condition, a large force may be unexpectedly applied to the locking mechanism 21 (e.g., due to a large load that can be unexpectedly applied to the vehicle seat 1). Typically, such a large force may act as a force that upwardly pulls the locking mechanism 21. That is, such a force may act as a force that urges the locking mechanism 21 to be disengaged from the bar 46. Therefore, when the large force is applied to the locking mechanism 21, the latch 26 is applied with a large clockwise rotational force so that the cam surface 40a of the cam member 40 is applied with a force via the projection 26b of the latch 26. However, as previously described, the cam surface 40a may appropriately be shaped such that the cam member 40 can be prevented from rotating when the clockwise rotational force is applied to the latch 26. As a result, the latch 26 is effectively prevented from rotating clockwise so as to be retained in the locking position. Thus, even if such a large force is applied to the locking mechanism 21, the locking mechanism 21 may reliably be retained in the locking condition.

Further, when the locking mechanism 21 is in the locking condition, if an excessively large force is applied to the locking mechanism 21 so that the latch 26 is applied with an excessively large clockwise rotational force, the cam member 40 is also applied with a corresponding large force so that the bent portion 40b of the cam member 40 is effectively deformed or crushed by such an excessively large clockwise rotational force applied to the latch 26, thereby permitting rotation of the latch 26. However, upon rotation of the latch 26, the contact surface 26d of the latch 26 may then effectively contact the engagement surface 30a of the pawl 30. Thus, the locking mechanism 21 may successively be retained in the locking condition after the bent portion 40b is deformed.

As will be appreciated, the bent portion (the deformable portion) 40b of the cam member 40 is positioned in a force transmitting path for transmitting the force that urges the locking mechanism 21 to be disengaged from the bar 46. Therefore, when such a force exceeds a predetermined value, the bent portion 40b can be deformed, thereby absorbing the excessive force. That is, the bent portion 40b of the cam member 40 may function as "an interrupting portion" for interrupting the force transmitting path.

Further, although the bent portion 40b is used as the interrupting portion of the force transmitting path in this embodiment, the projection 26b of the latch 26 can also be used as the interrupting portion, if desired. In such a case, the projection 26b can be formed as a shear deformable projection so as to be deformed when the force exceeds the predetermined value.

Figure 5:
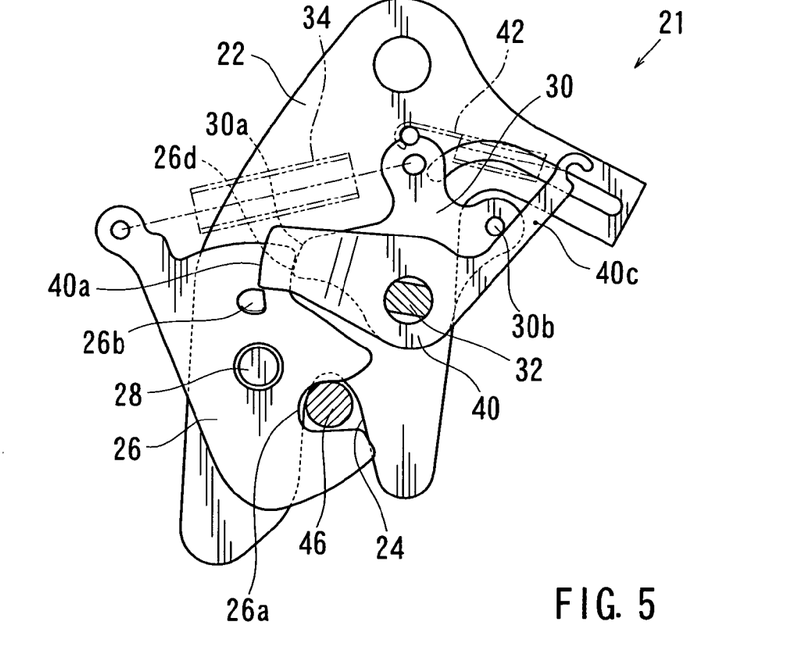
FIG. 5 is a side view of the locking device, which view illustrates a first step for unlocking the locking mechanism.
Figure 6:
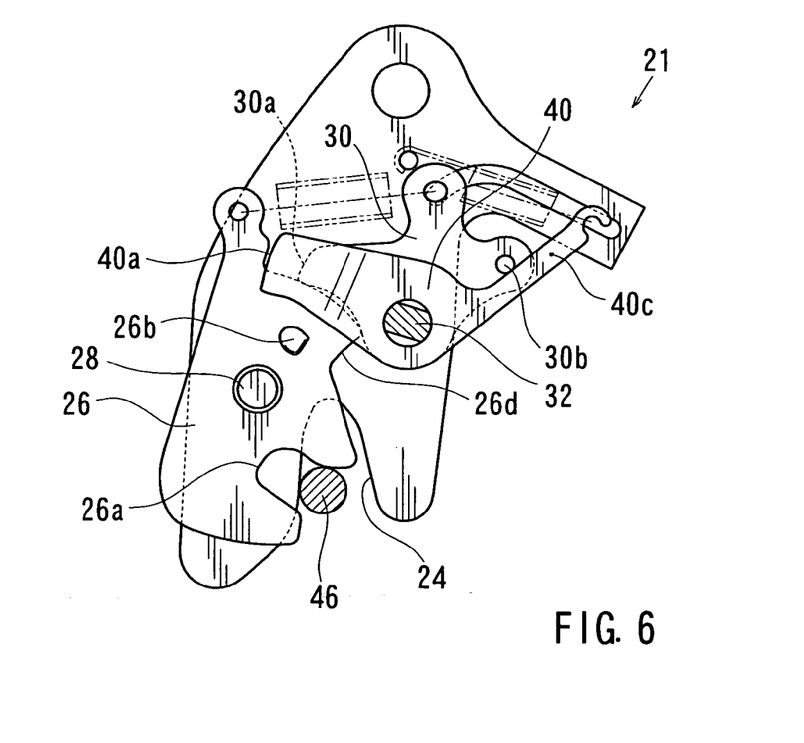
FIG. 6 is a side view of the locking device, which view illustrates a second or final step for unlocking the locking mechanism.

Operation for unlocking the locking mechanism 21 that is in the locking condition will now be described in detail with reference to FIGS. 5 and 6.

First, the actuator cable is pulled so that the lever 36 (FIG. 4) and the pivot pin 32 are rotated clockwise against the spring force of the extension spring 34, thereby rotating the pawl 30 clockwise. As a result, the projection 30b of the pawl 30 contacts the elongated portion 40c of the cam member 40, thereby rotating the cam member 40 clockwise around the pivot pin 32 against the spring force of the tension spring 42. Thus, the cam surface 40a of the cam member 40 is disengaged from the projection 26b of the latch 26. Consequently, the latch 26 rotates clockwise by the spring force of the extension spring 34 so that the contact surface 26d of the latch 26 contacts the engagement surface 30a of the pawl 30 (FIG. 5).

Thereafter, when the actuator cable is pulled further, the pawl 30 rotates clockwise together with the cam member 40 so that the engagement surface 30a of the pawl 30 is disengaged from the contact surface 26d of the latch 26. As a result, the latch 26 further rotates clockwise by the spring force of the extension spring 34 so that the hook slot 26a of the latch 26 is disengaged from the bar 46 (FIG. 6). Thus, the latch 26 is moved to an unlocking position so that the locking mechanism 21 is in an unlocking condition.

Second Detailed Representative Embodiment

The second detailed representative embodiment will now be described with reference to FIGS. 7–10. Because the second embodiment relates to the first embodiment, only constructions and elements that are different from the first embodiment will be explained in detail. Elements that are the same in the first and second embodiments will be identified by the same reference numerals and detailed descriptions of such elements will be omitted.

Figure 8:
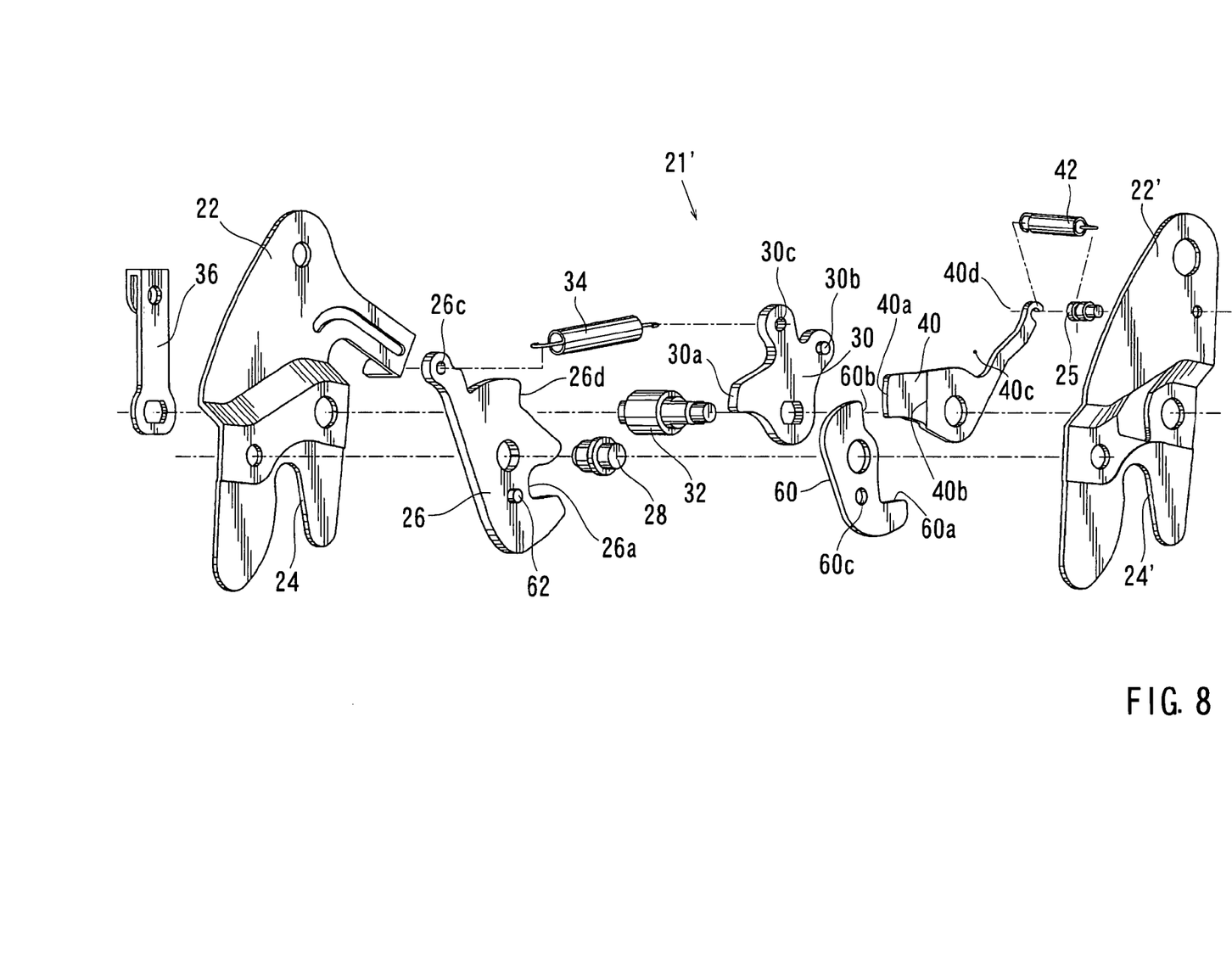
FIG. 8 is an exploded perspective view of a locking mechanism of the second embodiment of the locking device.

As best shown in FIG. 8, in a locking mechanism 21' of this embodiment, the latch 26 does not have a projection that corresponds to the projection 26b in the first embodiment. Instead, the latch 26 may preferably be formed with a projection 62 that projects parallel to the longitudinal axis of the pivot pin 28. The projection 62 may preferably be positioned adjacent to the hook slot 26a of the latch 26.

Also, the locking mechanism 21' may additionally include a supplemental latch 60. As best shown in FIG. 8, the supplemental latch 60 is rotatably supported via the pivot pin 28. The supplemental latch 60 may preferably be formed with a laterally facing upper contact surface 60b. The upper contact surface 60b may have substantially the same function as the latch projection 26b in the first embodiment. That is, when the locking mechanism 21' is in a locking condition, the contact surface 60b of the supplemental latch 60 can engage or contact the cam surface 40a of the cam member 40. Also, the supplemental latch 60 may preferably be formed with a lateral shouldered portion 60a. The shouldered portion 60a also can engage and disengage the bar 46 that is received in the slot 24. In addition, the supplemental latch 60 may preferably be formed with a laterally elongated slot 60c that is positioned adjacent to the shouldered portion 60a. The elongated slot 60c laterally movably receives the projection 62 of the latch 26.

Figure 7:
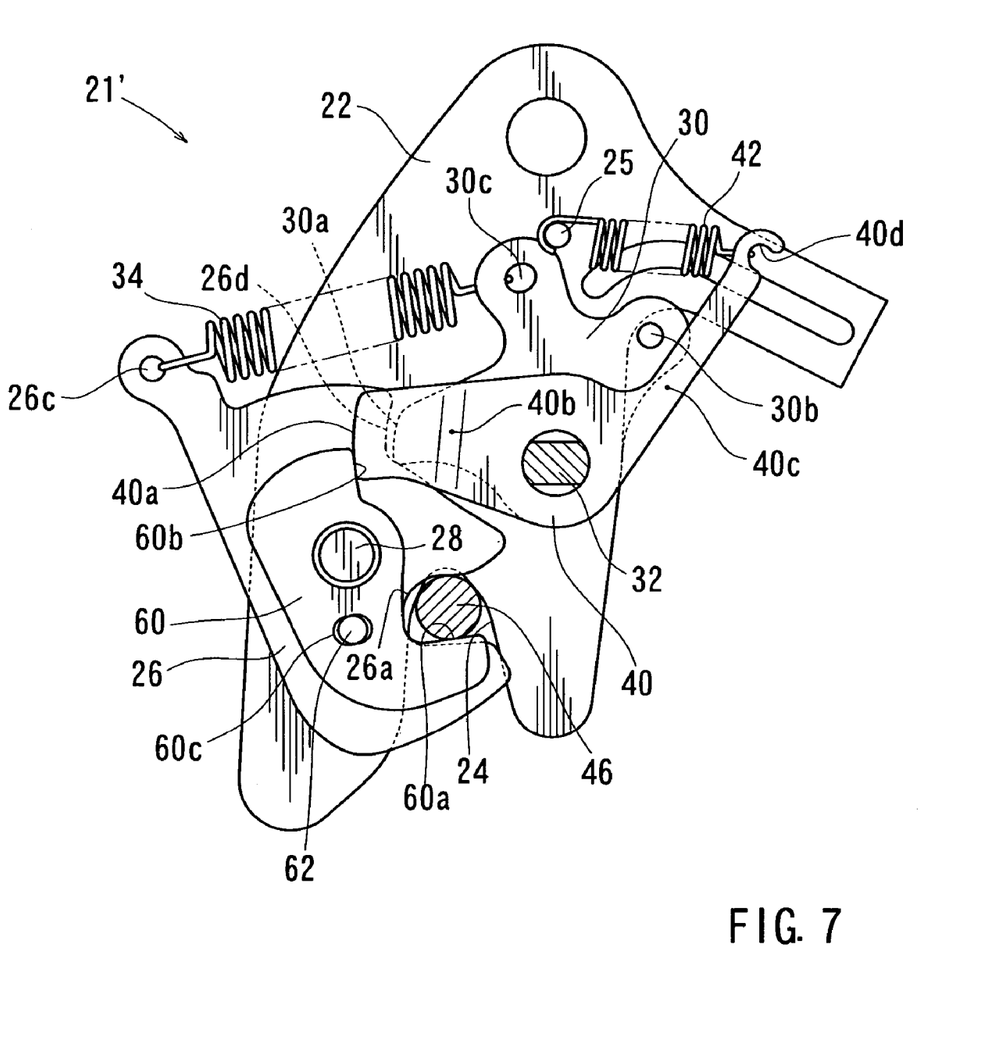
FIG. 7 is a side view of a locking device according to a second embodiment of the present teachings, which view illustrates a locking condition thereof.

As best shown in FIG. 7, the supplemental latch 60 thus constructed is superimposed over the latch 26 so that the latch projection 62 is received within the elongated slot 60c. Therefore, the supplemental latch 60 typically rotates together with the latch 26. However, the supplemental latch 60 can independently rotate relative to the latch 26 within a limited angle range because the projection 62 can move within the elongated slot 60c.

As shown in FIG. 7, when the locking mechanism 21' is in the locking condition, the hook slot 26a of the latch 26 engages the bar 46 that is received in the slot 24 of the base plate 22 so as to clamp the bar 46 within the slot 24. In the locking condition of the locking mechanism 21', the latch 26 is forced clockwise by means of the spring force of the extension spring 34 so that the hook slot 26a of the latch 26 engages an upper surface of the bar 46. Thus, the latch 26 may preferably be prevented from further rotating clockwise and retained in the locking position. At this time, the contact surface 60b of the supplemental latch 60 engages or contacts the cam surface 40a of the cam member 40. As a result, the supplemental latch 60 is forced counterclockwise so that the shouldered portion 60a engages a lower surface of the bar 46. Thus, the supplemental latch 60 may preferably be prevented from further rotating counterclockwise and consequently be retained in a locking position. Therefore, in the locking condition of the locking mechanism 21', unlike the locking condition of the locking mechanism 21 of the first embodiment, the latch 26 may preferably cooperate with the supplemental latch 60 so as to closely clamp or hold the bar 46 within the slot 24 of the base plate 22.

Further, the cam surface 40a may preferably be designed so as to provide an appropriate angle of pressure at a contact point between the cam surface 40a and the contact surface 60b of the supplemental latch 60. That is, the cam surface 40a may preferably be shaped such that the cam member 40 can be prevented from rotating (clockwise or counterclockwise) when the cam surface 40a is applied with a force via the contact surface 60b of the supplemental latch 60.

Figure 9:
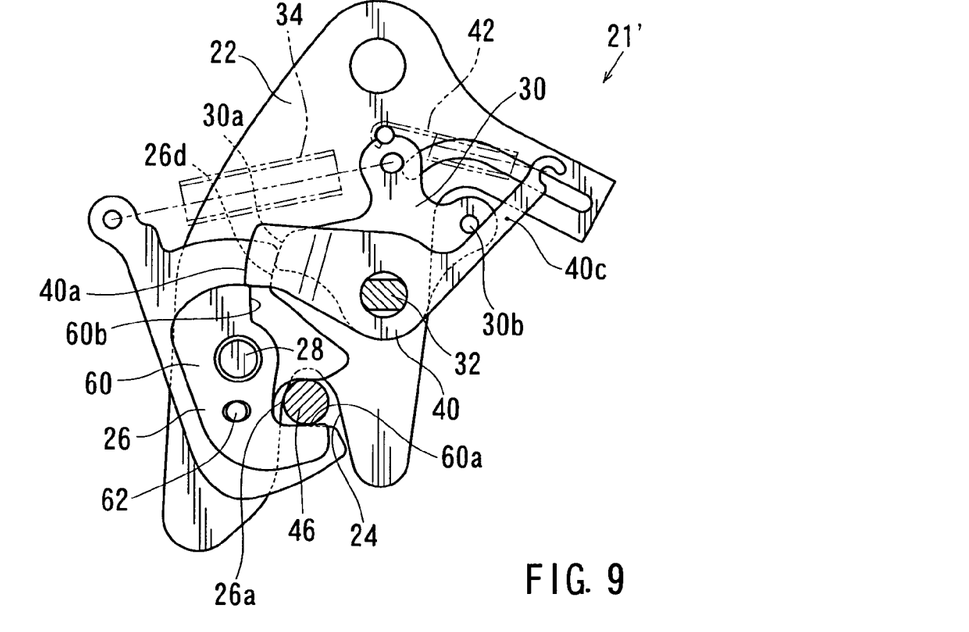
FIG. 9 is a side view of the locking device, which view illustrates a first step for unlocking the second embodiment of the locking mechanism.
Figure 10:
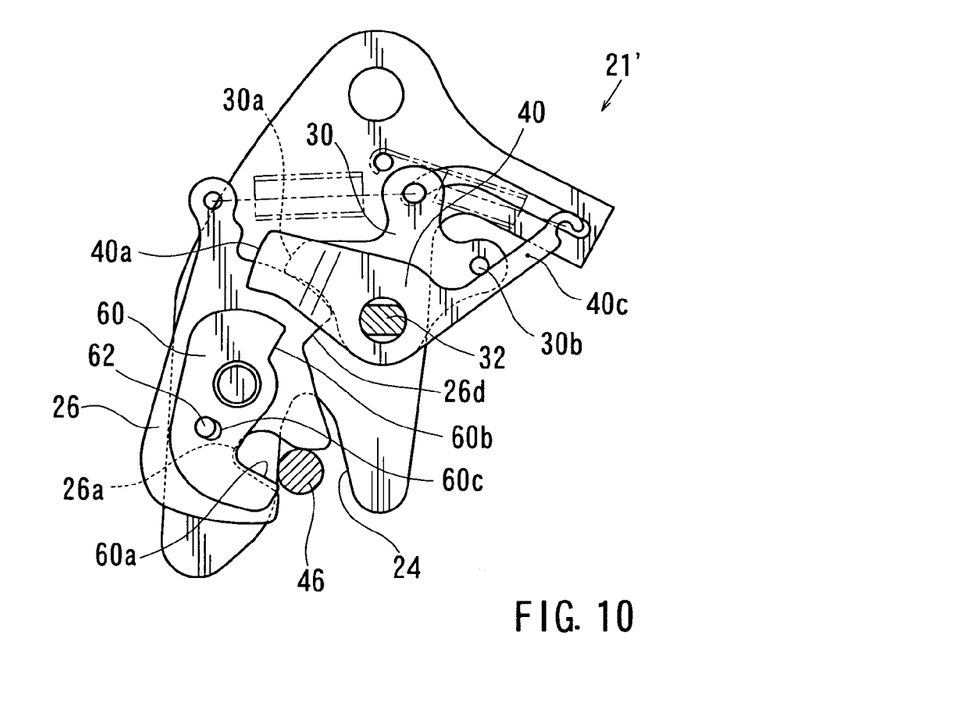
FIG. 10 is a side view of the locking device, which view illustrates a second or final step for unlocking the second embodiment of the locking mechanism.

Operation for unlocking the locking mechanism 21' that is in the locking condition will now be described in detail with reference to FIGS. 9 and 10.

First, similar to the first embodiment, the actuator cable is pulled so that the lever 36 (FIG. 8) and the pivot pin 32 are rotated clockwise against the spring force of the extension spring 34, thereby rotating the pawl 30 clockwise. As a result, the projection 30b of the pawl 30 contacts the elongated portion 40c of the cam member 40, thereby rotating the cam member 40 rotating clockwise around the pivot pin 32 against the spring force of the tension spring 42. Thus, the cam surface 40a of the cam member 40 is disengaged from the contact surface 60b of the supplemental latch 60. Consequently, the latch 26 rotates clockwise by the spring force of the extension spring 34 so that the contact surface 26d of the latch 26 contacts the engagement surface 30a of the pawl 30 (FIG. 9).

Thereafter, when the actuator cable is further pulled, the pawl 30 rotates clockwise together with the cam member 40 so that the engagement surface 30a of the pawl 30 is disengaged from the contact surface 26d of the latch 26. As a result, the latch 26 and the supplemental latch 60 further rotate clockwise by the spring force of the extension spring 34 so that the hook slot 26a of the latch 26 and the shouldered portion 60a of the supplemental latch 60 are disengaged from the bar 46 (FIG. 10). Thus, the latch 26 and the supplemental latch 60 are respectively moved to unlocking positions so that the locking mechanism 21' is in an unlocking condition.

Third Detailed Representative Embodiment

Figure 11:
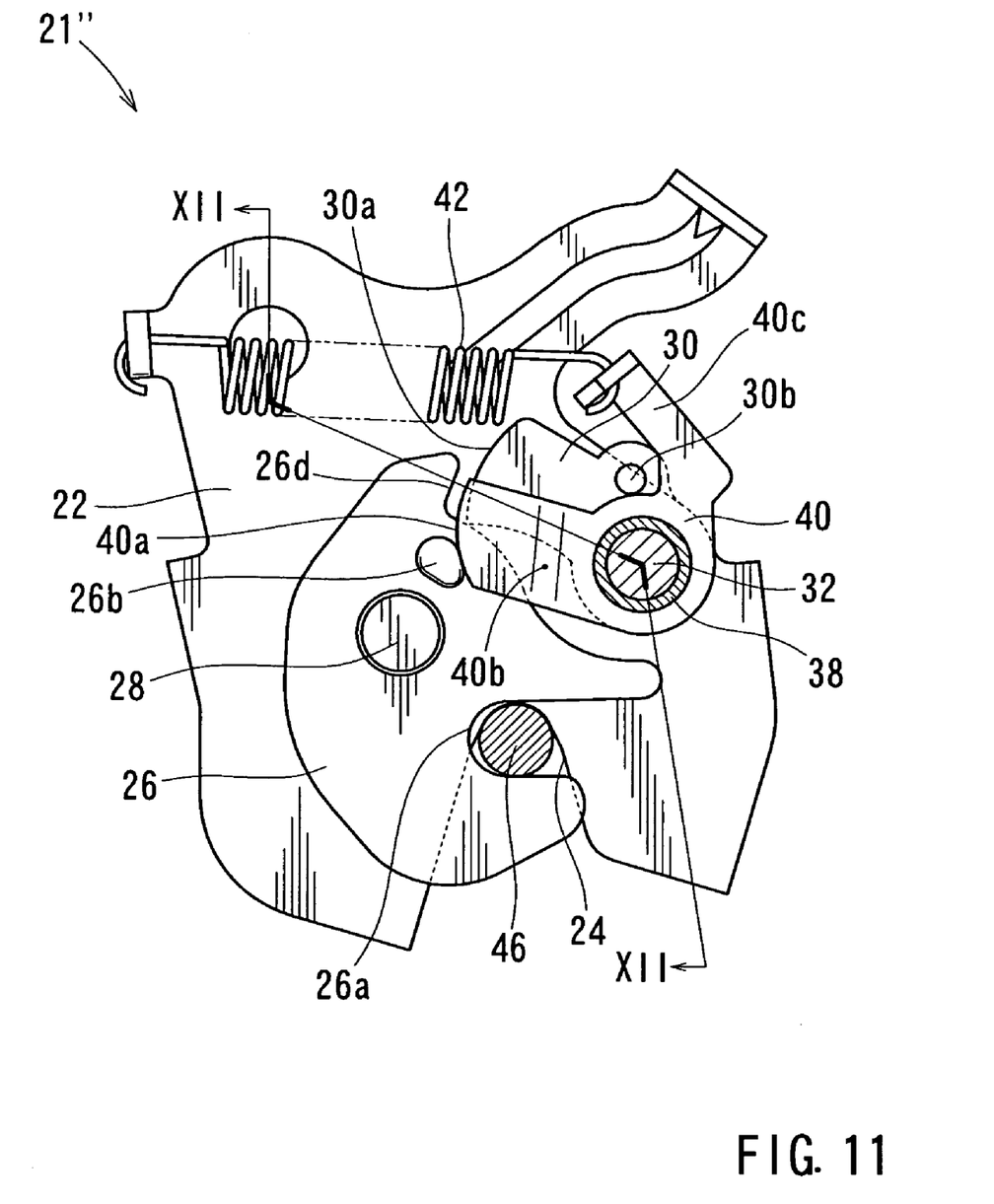
FIG. 11 is a side view of a locking device according to a third embodiment of the present teachings, which view illustrates a locking condition thereof.

The third detailed representative embodiment will now be described with reference to FIGS. 11–12. Because the third embodiment relates to the first embodiment, only constructions and elements that are different from the first embodiment will be explained in detail. Elements that are the same in the first and third embodiments will be identified by the same reference numerals and a detailed description of such elements will be omitted.

A locking mechanism 21" of this embodiment substantially has the same construction as the first embodiment except for the shape and arrangement of the base plate 22, the latch 26, the pawl 30 and the cam member 40. Further, although not shown in FIG. 11, the locking mechanism 21" includes an extension spring that corresponds to the extension spring 34 in the first embodiment. In other words, the latch 26 and the pawl 30 are respectively spring biased clockwise and counterclockwise.

Figure 12:
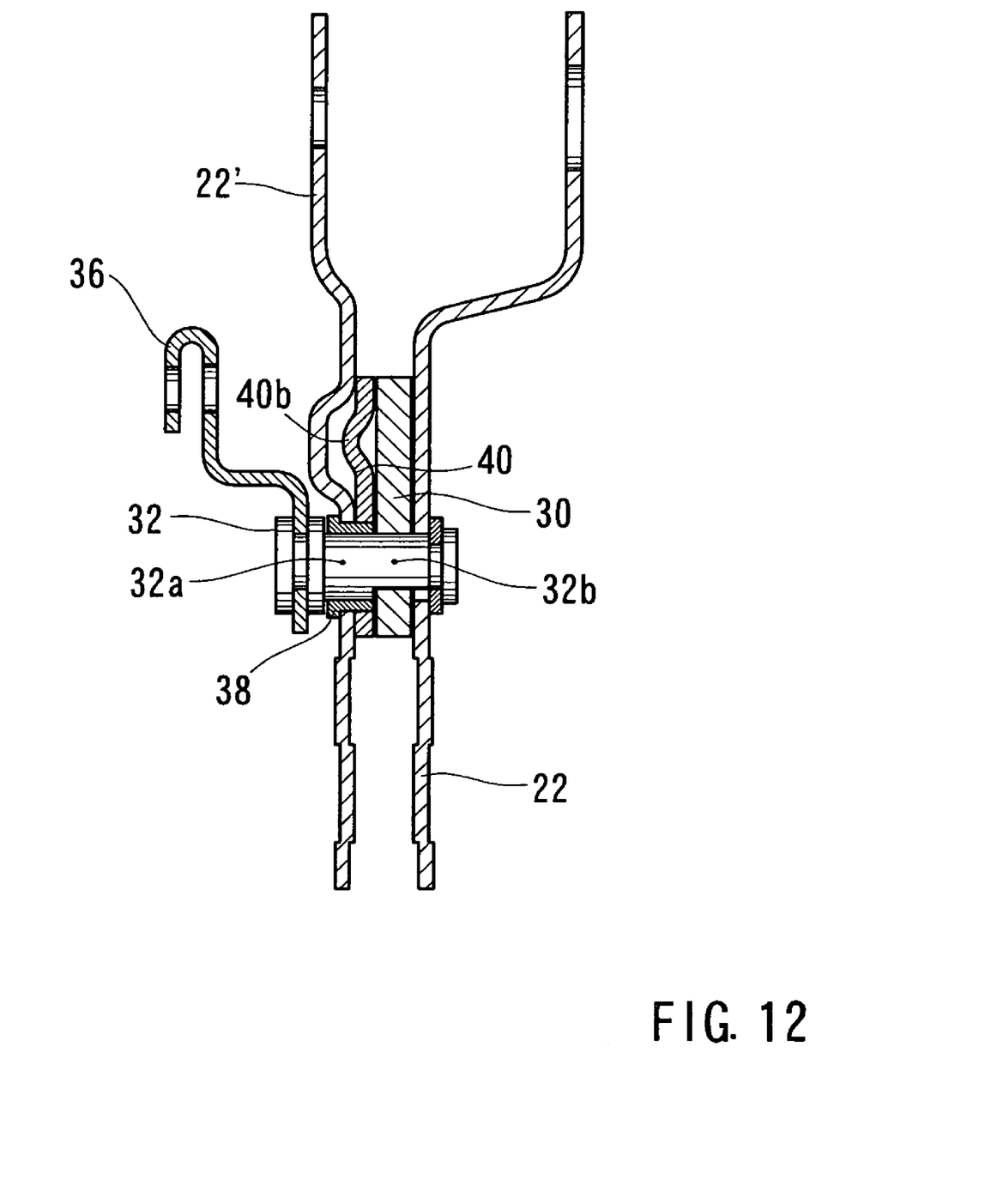
FIG. 12 is a cross-sectional view of the third embodiment taken along line XII—XII in FIG. 11.

As best shown in FIG. 12, in the locking mechanism 21", the pivot pin 32 may include a first portion 32a having a circular cross section and a second portion 32b having a semicircular cross section. A flanged bushing 38 is journaled on the first portion 32a of the pivot pin 32. The bushing 38 is received in and integrated with a bearing hole that is formed in the base plate 22', preferably by press fitting or welding. As will be recognized, the cam member 40 is rotatably supported via the bushing 38. According to this construction, the pivot pin 32 is not substantially affected by the spring force of the tension spring 42 because the pivot pin 32 is spaced from the cam member 40 by the bushing 38. As a result, the pivot pin 32 can be smoothly rotated. Further, the bushing 38 may preferably be formed from, but are not limited to, resinous materials having low coefficients of friction, oilless metals (porous metals) or general carbon steels.

Also, the pawl 30 is connected to the second portion 32b of the pivot pin 32 so as to integrally rotate with the pivot pin 32.

Typically, the pivot pin 32 is inserted into the bushing 38 attached to the base plate 22', the pawl 30 and the base plate 22 in a left-to-right fashion in FIG. 12. Thereafter, the pivot pin 32 is crimped at both ends. Further, the release lever 36 can be simultaneously attached to the base plate 22 or 22' when the pivot pin 32 is crimped.

Figure 13:
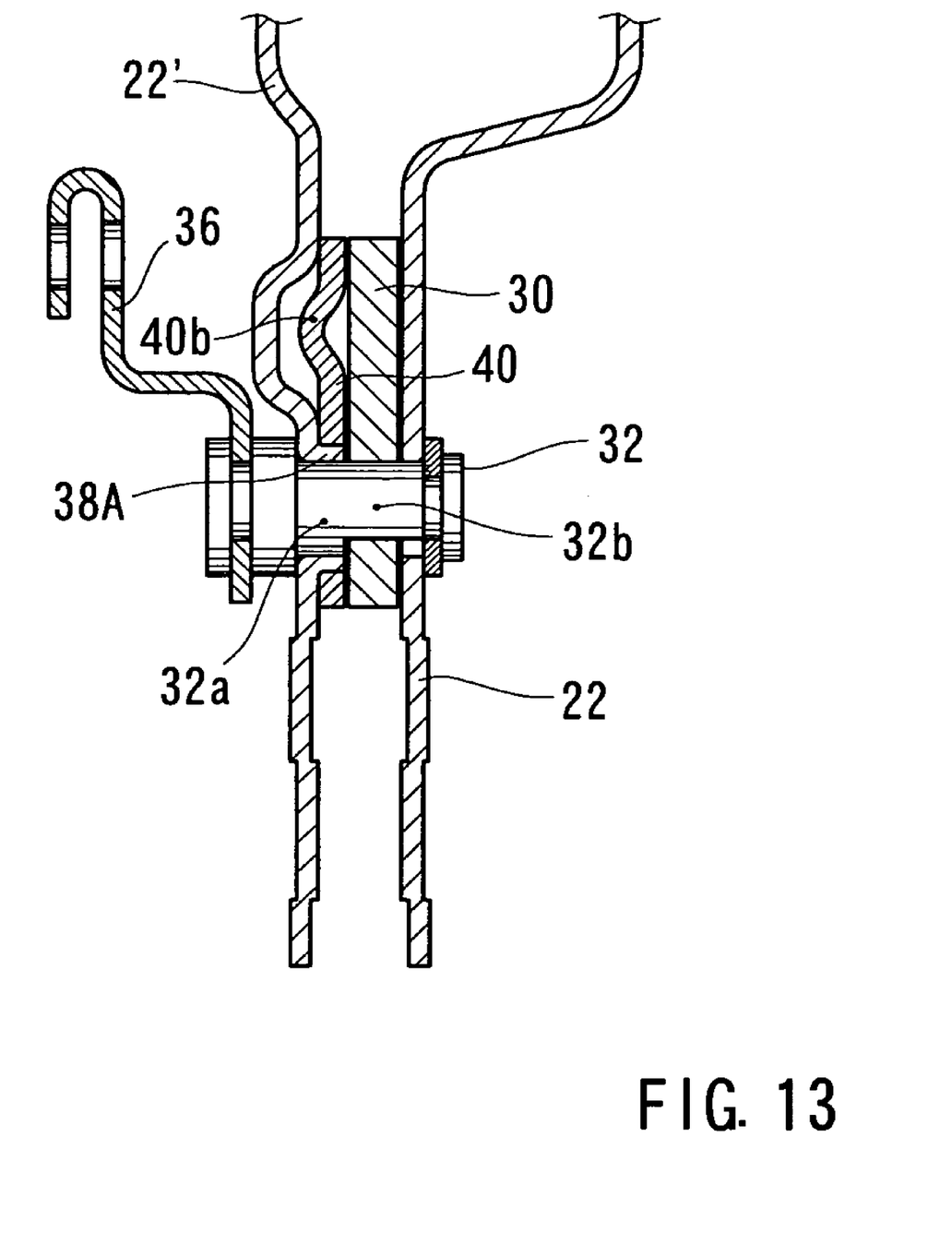
FIG. 13 is a cross-sectional view similar to FIG. 12, which view illustrates a modified form of the third embodiment.

Further, although in this embodiment, a bushing 38 that is separately formed is used, a bushing 38A that is integrally formed with the base plate 22', as shown in FIG. 13. As will be easily understood, the bushing 38A can be formed in the base plate 22', preferably by flanging around the bearing hole formed in the base plate 22'. The integrated bushing 38A thus formed can reduce the number of parts of the locking mechanism 21'', thereby reducing manufacturing costs of the locking mechanism 21''.

Fourth Detailed Representative Embodiment

Figure 15:
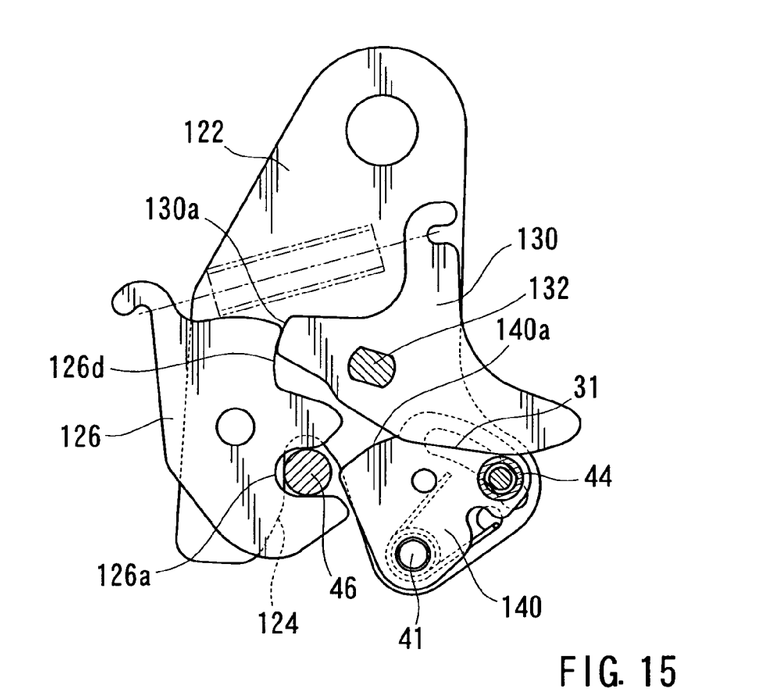
FIG. 15 is a side view of the fourth embodiment of the locking device, which view illustrates a first step for unlocking a locking mechanism.
Figure 16:
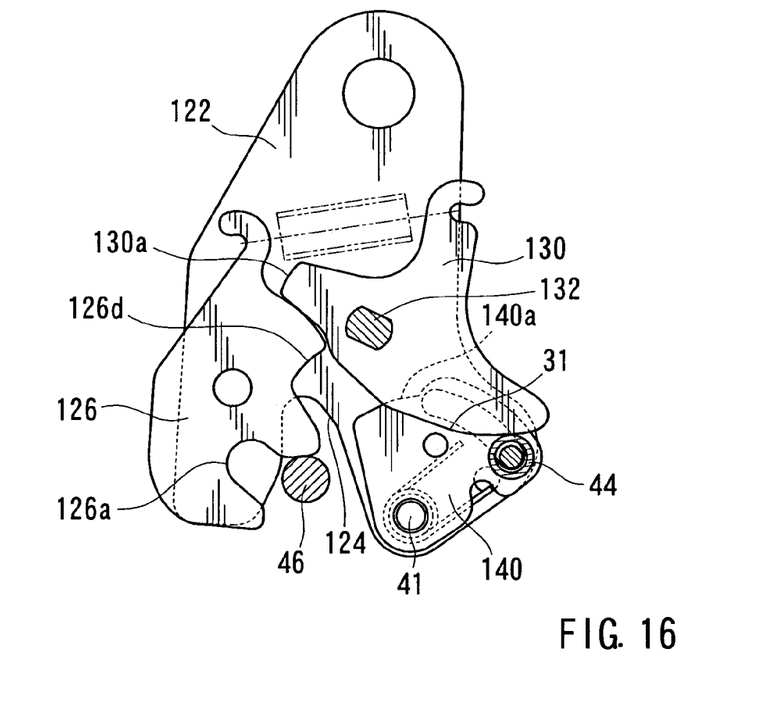
FIG. 16 is a side view of the fourth embodiment of the locking device, which view illustrates a second or final step for unlocking the locking mechanism.

The fourth detailed representative embodiment will now be described with reference to FIGS. 14–16. Because the fourth embodiment relates to the first embodiment, only constructions and elements that are different from the first embodiment will be explained in detail. Elements that are the same in the first and fourth embodiments will be identified by the same reference numerals and a detailed description of such elements will be omitted.

A locking mechanism 121 of this embodiment may include a first base plate 122, a latch 126, a pawl 130, a cam member 140 and a second base plate (not shown). Similar to the first embodiment, the latch 126 and the pawl 130 are disposed in substantially the same plane.

The base plate 122 may preferably have a U-shaped slot 124 that is formed in a lower end thereof and downwardly opens. The slot 124 is arranged and constructed to engage the bar 46.

The latch 126 is rotatably connected to the base plate 122 via a pivot pin 128. The latch 126 may preferably have a U-shaped hook slot 126a that laterally opens. Further, the latch 126 may preferably be formed with a laterally facing contact surface 126d that is positioned above the hook slot 126a. In addition, the latch 126 may preferably have an upper extension having a spring engagement strip 126c.

The pawl 130 is connected to the base plate 122 via a pivot pin 132. The pawl 130 may preferably be connected to the pivot pin 132 so as to rotate integrally with the pivot pin 132. The pawl 130 may preferably be formed with a laterally extending pawl extension having an engagement surface 130a. The engagement surface 130a is arranged and constructed to engage or contact the contact surface 126d of the latch 126 when the latch 126 is rotated clockwise. Further, the pawl 130 may preferably have a lateral extension that extends in a direction opposite to the pawl extension. The lateral extension may preferably be formed with a lower engagement surface 31. Also, the pawl 130 may preferably have a vertical extension having a spring engagement strip 130c.

An extension spring 134 is disposed between the latch 126 and the pawl 130. The extension spring 134 respectively engages the spring engagement strip 126c of the latch 126 and the spring engagement strip 130c of the pawl 130 so that the latch 126 and the pawl 130 can be respectively biased clockwise and counterclockwise.

Unlike the first embodiment, the cam member 140 may preferably be positioned between the pawl 130 and the base plate 122. The cam member 140 thus positioned is rotatably supported on the base plate 122 by a separate pivot pin 41 that is positioned at a lower end thereof. The cam member 140 may preferably be formed with a cam surface 140a. The cam surface 140a can engage or contact the bar 46 when the hook slot 126a of the latch 126 engages the bar 46 (i.e., when the locking mechanism 121 is in a locking condition).

The pivot pin 41 of the cam member 140 is provided with a torsion spring 142, which engages an engagement pin 140d attached to the cam member 140 and an engagement aperture 125 formed in the base plate 122. Therefore, the cam member 140 may preferably be biased counterclockwise around the pivot pin 41. As a result, the cam surface 140a of the cam member 140 may preferably press the bar 46 into the slot 124 of the base plate 122 when the locking mechanism 121 is in the locking condition. Thus, the cam surface 140a of the cam member 140 can securely clamp the bar 46 within the slot 124.

In addition, the cam member 140 is provided with a support pin 43 having a collar sleeve 44. The support pin 43 is positioned such that the engagement surface 31 of the pawl 130 can contact the collar sleeve 44 when the pawl 130 is rotated.

Figure 14:
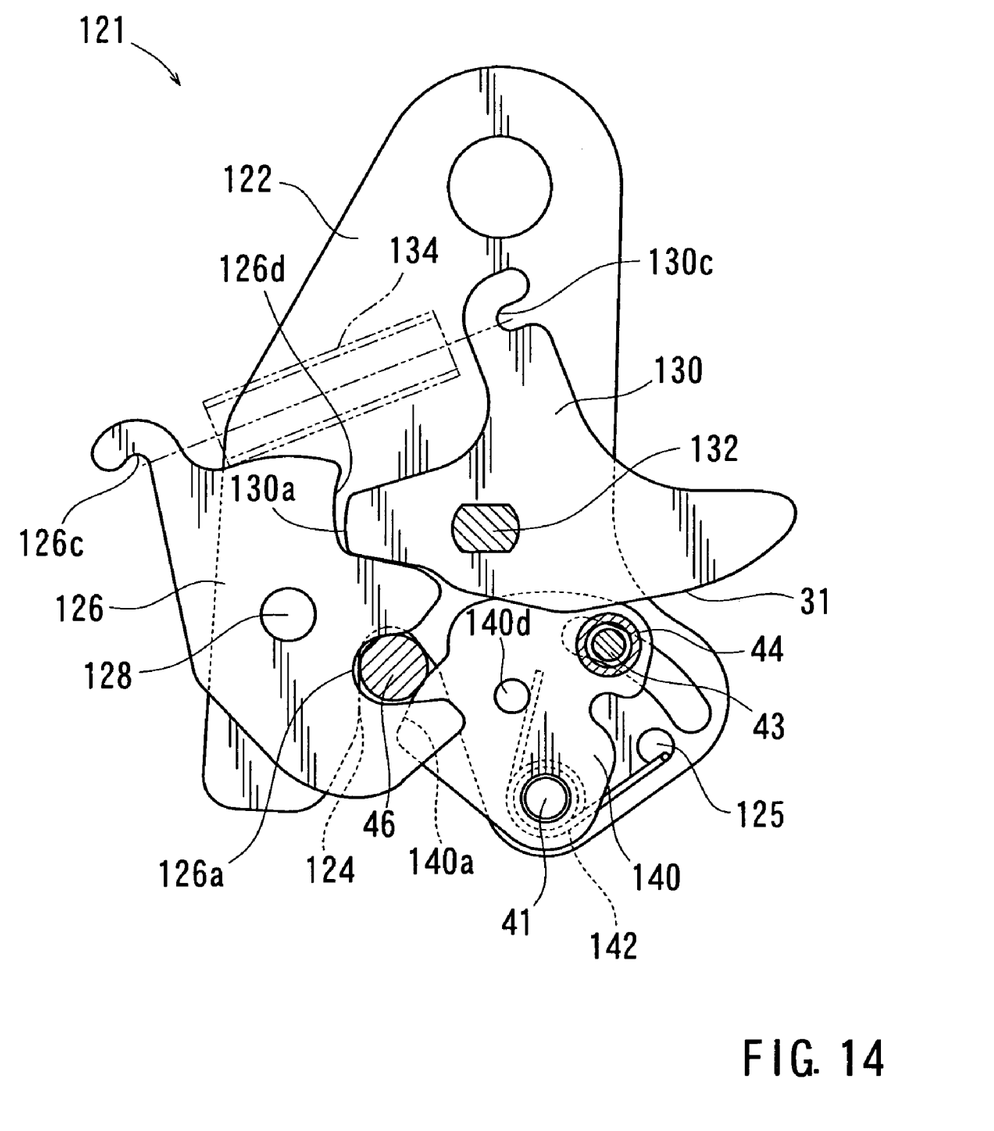
FIG. 14 is a side view of a locking device according to a fourth embodiment of the present teachings, which view illustrates a locking condition thereof.

As shown in FIG. 14, when the locking mechanism 121 is in the locking condition, the hook slot 126a of the latch 126 engages the bar 46 that is received in the slot 124 of the base plate 122. In the locking condition of the locking mechanism 121, the latch 126 is forced clockwise by means of the spring force of the extension spring 134 so that the hook slot 126a of the latch 126 contacts an upper surface of the bar 46. Thus, the latch 126 may preferably be prevented from further rotating clockwise and be retained in the locking position. At this time, the cam member 140 is forced counterclockwise by means of the spring force of the torsion spring 142 so that the cam surface 140a engages a lower surface of the bar 46. Thus, in the locking condition of the locking mechanism 121, the latch 126 may preferably cooperate with the cam member 140 so as to securely clamp or hold the bar 46 within the slot 124 of the base plate 122.

Unlike the first embodiment, the cam surface 140a may preferably be shaped such that the cam member 140 can rotate clockwise only when the cam surface 140a is applied with an excessively large force via the bar 46. That is, the cam member 140 can be prevented from rotating with the aid of the spring force of the torsion spring 142 when the locking mechanism 121 is applied with a substantial force (i.e., a limited force) that urges the locking mechanism 121 to be disengaged from the bar 46. Therefore, even if the locking mechanism 121 is subjected to such a force, the latch 126 is prevented from rotating clockwise so that the locking mechanism 121 is reliably retained in the locking condition.

However, when the locking mechanism 121 is in the locking condition, if a excessively large force is applied to the locking mechanism 121 so that the cam surface 140a is applied with the excessively large force via the bar 46, the cam member 140 is rotated clockwise against the spring force of the torsion spring 142. As a result, the latch 126 also rotates clockwise so that the contact surface 126d of the latch 126 may contact the engagement surface 130a of the pawl 130. Thus, the locking mechanism 121 may successively be retained in the locking condition.

Operation for unlocking the locking mechanism 121 that is in the locking condition will now be described in detail with reference to FIGS. 15 and 16.

First, similar to the first embodiment, the actuator cable is pulled so that the lever (not shown) and the pivot pin 132 are rotated clockwise against the spring force of the extension spring 134, thereby rotating the pawl 130 clockwise. As a result, the engagement surface 31 of the pawl 130 contacts and presses the collar sleeve 44 of the cam member 140, thereby rotating the cam member 140 clockwise around the pivot pin 41 against the spring force of the torsion spring 142. Thus, the cam surface 140a of the cam member 140 is disengaged from the bar 46. Consequently, the latch 126 rotates clockwise by the spring force of the extension spring 134 so that the contact surface 126d of the latch 126 contacts the engagement surface 130a of the pawl 130 (FIG. 15).

Thereafter, when the actuator cable is further pulled, the pawl 130 further rotates clockwise while rotating the cam member 140 so that the engagement surface 130a of the pawl 130 is disengaged from the contact surface 126d of the latch 126. As a result, the latch 126 further rotates clockwise by the spring force of the extension spring 134 so that the hook slot 126a of the latch 126 is disengaged from the bar 46 (FIG. 16). Thus, the latch 126 is moved to an unlocking position so that the locking mechanism 121 is in an unlocking condition.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

The invention claimed is:

1. A locking device, comprising:
a striker attached to one of two members to be interconnected, and
a locking mechanism attached to the other of the two members, the locking mechanism comprising:
  a base plate having a slot that can receive the striker;
  a latch rotatably attached to the base plate, the latch being arranged and constructed to clamp the striker within the base plate slot so that the locking mechanism is in a locking condition;
  a pawl rotatably attached to the base plate, the pawl being arranged and constructed to engage the latch so that the locking mechanism is retained in the locking condition; and
  a cam member rotatably attached to the base plate, the cam member being arranged and constructed to urge the latch to a locking position by a spring force when the locking mechanism is in the locking condition,
wherein the locking mechanism includes a force transmitting path for transmitting a force that urges the locking mechanism in the locking condition to be disengaged from the striker, the force transmitting path passes through the cam member and includes a force interrupting portion positioned therein, the force interrupting portion is arranged and constructed to interrupt the force transmitting path when the force exceeds a predetermined value.

2. A locking device as defined in claim 1 wherein the force interrupting portion comprises a transversal bent portion formed in the cam member, the bent portion is positioned between a rotational shaft of the cam member and a contact point of the cam member and the latch.

3. A locking device as defined in claim 1 wherein the force interrupting portion comprises a weakened portion formed in at least one of the cam member and the latch, the weakened portion is arranged and constructed to deform when the force exceeds the predetermined value.

4. A locking device as defined in claim 3 wherein the weakened portion comprises a projection that is formed in the latch.

5. A locking device as defined in claim 1 wherein the pawl has the same thickness as the latch and is positioned in substantially the same plane as the latch, wherein the cam member is coaxially rotatably superimposed over the pawl, and wherein the latch has a projection that is arranged and constructed to contact the cam member.

6. A locking device, comprising:
a striker attached to one of two members to be interconnected, and
a locking mechanism attached to the other of the two members, the locking mechanism comprising:
  a base plate having a slot that can receive the striker;
  a latch rotatably attached to the base plate, the latch being arranged and constructed to clamp the striker within the base plate slot so that the locking mechanism is in a locking condition;
  a pawl rotatably attached to the base plate, the pawl being arranged and constructed to engage the latch so that the locking mechanism is retained in the locking condition; and
  a cam member rotatably attached to the base plate, the cam member being arranged and constructed to urge the latch to a locking position by a spring force when the locking mechanism is in the locking condition,
wherein the pawl and the cam member are attached to the base plate via a common rotational shaft, the pawl is integrated with the rotational shaft and the cam member can rotate around the rotational shaft, and
wherein the locking mechanism includes a force transmitting path for transmitting a force that urges the locking mechanism in the locking condition to be disengaged from the striker, the force transmitting path passes through the cam member and includes a force interrupting portion positioned therein, the force interrupting portion is arranged and constructed to interrupt the force transmitting path when the force exceeds a predetermined value.

7. A locking device as defined in claim 6 wherein the force interrupting portion comprises a bent portion formed in the cam member, the bent portion is positioned between the rotational shaft of the cam member and a contact point of the cam member and the latch.

8. A locking device as defined in claim 6 wherein the force interrupting portion comprises a weakened portion formed in at least one of the cam member and the latch, the weakened portion is arranged and constructed to be crushed when the force exceeds the predetermined value.

9. A locking device as defined in claim 8 wherein the weakened portion comprises a projection that is formed in the latch.

10. A locking device as defined in claim 6 wherein the pawl has the same thickness as the latch and is positioned in substantially the same plane as the latch, wherein the cam member is coaxially rotatably superimposed over the pawl, and wherein the latch has a projection that is arranged and constructed to contact the cam member.

11. A locking device as defined in claim 6 further comprising a bushing that is journaled on the rotational shaft, wherein the bushing is secured to the base plate such that the cam member can be rotated around the bushing.

12. A locking device as defined in claim 6 further comprising a bushing that is journaled on the rotational shaft, wherein the bushing is integrally formed by flanging the base plate such that the cam member can be rotated around the bushing.

13. A locking devices, comprising:
a striker attached to one of two members to be interconnected, and
a locking mechanism attached to the other of the two members, the locking mechanism comprising:
  a base plate having a slot that can receive the striker;
  a latch rotatably attached to the base plate, the latch being arranged and constructed to clamp the striker within the base plate slot so that the locking mechanism is in a locking condition;
  a pawl rotatably attached to the base plate, the pawl being arranged and constructed to engage the latch so that the locking mechanism is retained in the locking condition; and
  a cam member rotatably attached to the base plate, the cam member being arranged and constructed to urge the latch to a locking position by a spring force when the locking mechanism is in the locking condition,
  wherein the locking mechanism includes a force transmitting path for transmitting a force that urges the locking mechanism in the locking condition to be disengaged from the striker, the force transmitting path passes through the cam member, the cam member is formed with a deformable portion that is arranged and constructed to be deformed along the force transmitting path when the force exceeds a predetermined value.

14. A locking device as defined in claim 13 wherein the pawl has the same thickness as the latch and is positioned in substantially the same plane as the latch, wherein the cam member is coaxially rotatably superimposed over the pawl, and wherein the latch has a projection that is arranged and constructed to contact the cam member.

15. A locking devices, comprising:
a striker attached to a vehicle body, and
a locking mechanism attached to a vehicle seat, the locking mechanism comprising:
  a base plate having a slot that can receive the striker;
  a latch rotatably attached to the base plate, the latch being arranged and constructed to clamp the striker within the base plate slot so that the locking mechanism is in a locking condition;
  a pawl rotatably attached to the base plate, the pawl being arranged and constructed to engage the latch so that the locking mechanism is retained in the locking condition;
  a cam member rotatably attached to the base plate, the cam member being arranged and constructed to urge the latch to a locking position by a spring force when the locking mechanism is in the locking condition, and
  a release lever for unlocking the locking mechanism,
  wherein the pawl and the cam member are attached to the base plate via a common rotational shaft, the pawl is integrated with the rotational shaft,
  wherein the release lever is connected to the rotational shaft so that the pawl is rotated with the rotational shaft when the release lever is rotated in an unlocking rotational direction, thereby rotating the cam member, and
  wherein the locking mechanism includes a force transmitting path for transmitting a force that urges the locking mechanism in the locking condition to be disengaged from the striker, the force transmitting path passes through the cam member and includes a force interrupting portion positioned therein, the force interrupting portion is arranged and constructed to interrupt the force transmitting path when the force exceeds a predetermined value.

16. A locking device as defined in claim 15 further comprising a bushing that is journaled on the rotational shaft, wherein the bushing is secured to the base plate such that the cam member can be rotated around the bushing.

17. A locking device as defined in claim 15 further comprising a bushing that is journaled on the rotational shaft, wherein the bushing is integrally formed by flanging the base plate such that the cam member can be rotated around the bushing.

18. The locking device of claim 1, wherein the pawl is configured to be spaced apart from the latch when the locking mechanism is in the locking condition, and wherein the force interrupting portion is arranged and constructed to interrupt the force transmitting path when the force exceeds a predetermined value, such that the pawl is moved into contact with the latch thereby retaining the locking mechanism in the locking condition.

19. The locking device of claim 6, wherein the pawl is configured to be spaced apart from the latch when the locking mechanism is in the locking condition, and wherein the force interrupting portion is arranged and constructed to interrupt the force transmitting path when the force exceeds a predetermined value, such that the pawl is moved into contact with the latch thereby retaining the locking mechanism in the locking condition.

20. The locking device of claim 13, wherein the pawl is configured to be spaced apart from the latch when the locking mechanism is in the locking condition, and wherein the force interrupting portion is arranged and constructed to interrupt the force transmitting path when the force exceeds a predetermined value, such that the pawl is moved into contact with the latch thereby retaining the locking mechanism in the locking condition.

21. The locking device of claim 15, wherein the pawl is configured to be spaced apart from the latch when the locking mechanism is in the locking condition, and wherein the force interrupting portion is arranged and constructed to interrupt the force transmitting path when the force exceeds a predetermined value, such that the pawl is moved into contact with the latch thereby retaining the locking mechanism in the locking condition.

* * * * *